(12) United States Patent
Kragl et al.

(10) Patent No.: US 8,301,030 B2
(45) Date of Patent: Oct. 30, 2012

(54) ROTARY JOINT

(75) Inventors: Hans Kragl, Dieckholzen (DE); Ulrich Wetzel, Herzogenaurach (DE)

(73) Assignee: Siemens Aktiengesellschaft, München (DE)

( * ) Notice: Subject to any disclaimer, the term of this patent is extended or adjusted under 35 U.S.C. 154(b) by 466 days.

(21) Appl. No.: 12/514,341

(22) PCT Filed: Oct. 19, 2007

(86) PCT No.: PCT/EP2007/061183
§ 371 (c)(1),
(2), (4) Date: May 11, 2009

(87) PCT Pub. No.: WO2008/058825
PCT Pub. Date: May 22, 2008

(65) Prior Publication Data
US 2010/0040379 A1   Feb. 18, 2010

(30) Foreign Application Priority Data
Nov. 16, 2006   (DE) .......................... 10 2006 054 052

(51) Int. Cl.
*H04B 10/12* (2006.01)

(52) U.S. Cl. .................... 398/142; 398/141; 398/114

(58) Field of Classification Search .................. 398/142, 398/141, 114
See application file for complete search history.

(56) References Cited

U.S. PATENT DOCUMENTS
2003/0210859 A1 * 11/2003 Mercey et al. ................. 385/26
2009/0310911 A1 * 12/2009 Zhang et al. .................... 385/26

FOREIGN PATENT DOCUMENTS
| | | |
|---|---|---|
| DE | 200 15 959 U1 | 12/2000 |
| DE | 100 50 890 A1 | 4/2002 |
| GB | 1 587 531 A | 4/1981 |
| JP | 58 105203 A | 6/1983 |
| JP | 2310508 A | 12/1990 |
| JP | 2003008053 A | 1/2003 |
| WO | WO 99/18463 A1 | 4/1999 |

OTHER PUBLICATIONS
Reed, "New Rings Slip into Orbit", Machine design, Penton media, Cleveland, Oh, US, Nov. 26, 1992, pp. 78-82, vol. 64, No. 23, XP000328542; ISSN: 0024-9114.

* cited by examiner

*Primary Examiner* — Kinam Park

(57) ABSTRACT

A rotary transmitter having a first light-conducting hollow body, at least one transmitter for generating at least one optical signal and at least one receiver for receiving the optical signal is disclosed. The optical signal is transmitted from the transmitter to the receiver via the first light-conducting hollow body.

20 Claims, 2 Drawing Sheets

ROTARY JOINT

CROSS REFERENCE TO RELATED APPLICATIONS

This application is the US National Stage of International Application No. PCT/EP2007/061183 filed Oct. 19, 2007 and claims the benefit thereof. The International Application claims the benefits of German Patent Application No. 10 2006 054 052.2 DE filed Nov. 16, 2006, both of the applications are incorporated by reference herein in their entirety.

FIELD OF INVENTION

The invention relates to a rotary joint.

BACKGROUND OF INVENTION

Rotary joints are used to transmit data from a rotating object, such as a shaft for example, to a stationary object, such as a closed-loop control module located in a switchgear cabinet.

In the case of standard commercially available rotary joints the data is transmitted by means of slip rings for example.

Also known are rotary joints in which data is transmitted from the rotating to the stationary part by means of optical signal transmission. In this case a transmitter disposed in the axial center of rotation of the shaft transmits a light signal to a stationary receiver that is likewise disposed in an axially central manner. However said type of optical rotary joint embodied in a standard commercially available configuration is unsuitable for transmitting signals if the shaft is embodied as a hollow shaft, since the transmitter cannot be disposed in the axial center of rotation of the shaft but must be disposed on the hollow shaft outside the center of rotation, with the result that data can only be transmitted when the shaft and therefore the transmitter are in a specific angular position such that transmission to the receiver, which is likewise disposed outside the center of rotation, is possible. When a single transmitter and a single receiver are used it is then generally only possible to transmit data just once per rotation of the shaft, at a specific angular position of the shaft, i.e. precisely when the transmitter and receiver are axially opposite each other, so that the light beam emitted by the transmitter can be received by the receiver.

SUMMARY OF INVENTION

An object of the invention is to provide a rotary joint in which reliable signal transmission is possible, in particular also when hollow shafts are used.

This object is achieved by a rotary joint having
a first light-conducting hollow body,
at least one transmitter for generating at least one light signal, and
at least one receiver for receiving the light signal, wherein the light signal can be transmitted from the transmitter to the receiver by way of the first hollow body.

Advantageous embodiments of the invention will emerge from the dependent claims.

It proves advantageous for the rotary joint to have a second light-conducting hollow body, with the first hollow body and the second hollow body being disposed coaxially and rotatably relative to each other. In the case of the embodiment variant according to FIG. 2, a bidirectional transmission is made possible by means of the second hollow body.

It proves advantageous for the first and the second hollow body to be arranged coaxially one behind the other, wherein the light signal can be transmitted from the transmitter to the receiver by way of the first and the second hollow body, since this enables the rotary joint to be constructed with a mechanically simple design.

It also proves advantageous for the first and the second hollow body to be arranged coaxially one inside the other at least in a partial region, since then it is ensured that the light signal is transmitted from the transmitter to the receiver by way of the first and the second hollow body in a manner that is particularly impervious to interference.

It furthermore proves advantageous for the first and/or the second hollow body to be embodied in the form of a tube. An embodiment of the hollow body as a tube permits a particularly simple design of the rotary joint. It should be noted at this juncture that given a corresponding narrow embodiment of the tube in the tube's longitudinal direction, the tube can also be embodied in the form of a ring. It should also be noted that the ring does not necessarily have to have a round cross-sectional area, but can also have an angular cross-sectional area (e.g. a hexagonal tube).

It furthermore proves advantageous for the transmitter to be connected to an end face of the first hollow body by way of a plurality of optical waveguides for transmitting the light signal. As a result of this measure only at least one single transmitter is necessary in the case of a unidirectional transmission while at the same time a high level of transmission reliability is assured.

It also proves advantageous for the optical waveguides to be connected to an end face of the first hollow body by means of connectors uniformly distributed over the end face. A continuous transmission of the data is ensured by means of this measure.

It also proves advantageous for the rotary joint to have a first transmitter for generating a first light signal and a second transmitter for generating a second light signal, wherein the rotary joint has a first receiver for receiving the first light signal and a second receiver for receiving the second light signal, wherein the first light signal can be transmitted from the first transmitter to the first receiver by way of the first and the second hollow body, wherein the second light signal can be transmitted from the second transmitter to the second receiver by way of the second and the first hollow body. This enables bidirectional data communication.

It also proves advantageous for the rotary joint to have a first transmitter for generating a first light signal and a second transmitter for generating a second light signal, wherein the rotary joint has a first receiver for receiving the first light signal and a second receiver for receiving the second light signal, wherein the first light signal can be transmitted from the first transmitter to the first receiver by way of the first hollow body, wherein the second light signal can be transmitted from the second transmitter to the second receiver by way of the second hollow body. This enables bidirectional data communication.

It furthermore proves advantageous for the first transmitter to be connected to an end face of the first hollow body by way of a plurality of optical waveguides for transmitting the first light signal, wherein the second transmitter is connected to an end face of the second hollow body by way of a plurality of further optical waveguides for transmitting the second light signal. As a result of this measure only at least two transmitters are necessary in the case of a bidirectional transmission while at the same time a high level of transmission reliability is assured.

It also proves advantageous for the optical waveguides to be connected to an end face of the first hollow body by means of connectors uniformly distributed over the end face of the first hollow body, wherein the further optical waveguides are connected to an end face of the second hollow body by means of connectors uniformly distributed over the end face of the second hollow body. A continuous transmission of the data is ensured by means of this measure.

BRIEF DESCRIPTION OF THE DRAWINGS

Two exemplary embodiments of the invention are illustrated in the drawing and explained in more detail below. In the figures.

DETAILED DESCRIPTION OF INVENTION

Figure 1:
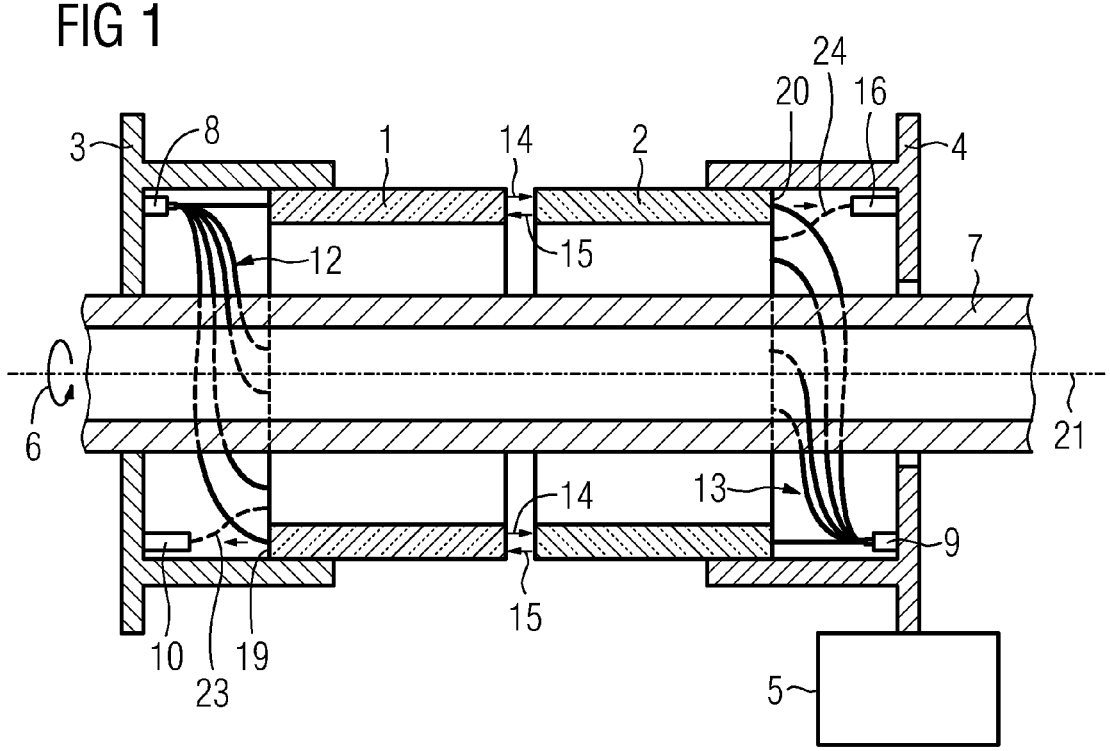
FIG. 1 shows a first inventive embodiment of the rotary joint.

FIG. 1 shows a first embodiment of the rotary joint in the form of a schematic representation. In this case the rotary joint has a first housing part 3 which is fixedly connected to a rotating (see arrow 6) hollow shaft 7. The hollow shaft 7 can therein be present e.g. in the form of a motor shaft. As a result of the fixed connection of the first housing part 3 to the hollow shaft 7 the first housing part 3 co-rotates with the hollow shaft 7. In addition the rotary joint has a second stationary housing part 4 which is fixedly connected to a machine bed 5, e.g. a machine tool. The rotary joint also has a first light-conducting hollow body 1 and a second light-conducting hollow body 2. Within the scope of the exemplary embodiment the two hollow bodies are embodied as light-transmitting tubes, made e.g. of glass or Plexiglas. The first hollow body 1 is fixedly connected to the first housing part 3 and the second hollow body 2 is fixedly connected to the second housing part 4. In such a way the first hollow body co-rotates with the hollow shaft 7, while the second hollow body 2 is stationary. A first transmitter 8 for generating a light signal is connected to an end face 19 of the first hollow body 1 via optical waveguides 12 for transmitting the light signal. For the purpose of receiving the light signal the rotary joint additionally has a first receiver 16 which is fixedly connected to the second housing part 4. The light signal is transmitted from the first transmitter 8 by way of the first and the second hollow body to the first receiver 16, the transmission of the light signal from the first hollow body 1 to the second hollow body 2 being indicated by the two arrows 14. The first hollow body 1 and the second hollow body 2 can be rotated relative to each other and are arranged coaxially with respect to an axis of rotation 21 of the hollow shaft 7. Within the scope of a first embodiment of the invention according to FIG. 1, the first and the second hollow body are in this case arranged coaxially one behind the other and a transmission of the light signal from the rotating first hollow body to the stationary second hollow body 2 takes place via the opposing end faces of the two hollow bodies. In this case the two hollow bodies have an identical diameter. A unidirectional data communication thus takes place from the first transmitter 8 by way of the first hollow body 1 and the second hollow body 2 and the first receiver 16, with data being transferred from the rotating components to the stationary components. In such a way e.g. the data of a sensor co-rotating with the hollow shaft 7 can be transmitted via the rotary joint to an e.g. stationary closed-loop control module disposed in a switching cabinet.

In order to implement a unidirectional data connection it is therefore sufficient if the rotary joint has a single transmitter and a single receiver.

In order to implement a bidirectional data communication, the rotary joint in the exemplary embodiment according to FIG. 1 additionally has a second transmitter 9 which is fixedly connected to the second housing part 4 and is connected by way of further optical waveguides 13 to an end face 20 of the second hollow body 2, and a second receiver 10 which is fixedly connected to the first housing part 3. The second transmitter 9 generates a second light signal which is transmitted from the second transmitter 9 by way of the second and the first hollow body to the second receiver 10. The transmission of the second light signal from the second hollow body 2 to the first hollow body 1 is indicated in FIG. 1 by means of arrows 15. In such a way data can also be transmitted from the stationary housing part to the rotating housing part. The first and the second receiver are disposed outside the axis of rotation 21 of the hollow shaft 7, opposite the respectively opposing end face 19 or 20. The light signals emerging from the hollow bodies at the end face side in the direction of the receiver are indicated in FIG. 1 by means of an arrow in each case.

In order to ensure a very good signal transmission, the receiver 16 can, if necessary or desired, optionally be connected to the second hollow body 2 via an additional optical waveguide 24 and/or the receiver 10 can be connected to the first hollow body 1 via an additional optical waveguide 23 (indicated by a dashed line in FIG. 1). This has the advantage that the respective receiver no longer necessarily has to be disposed on the respectively associated opposite end face 19 or 20.

Figure 2:
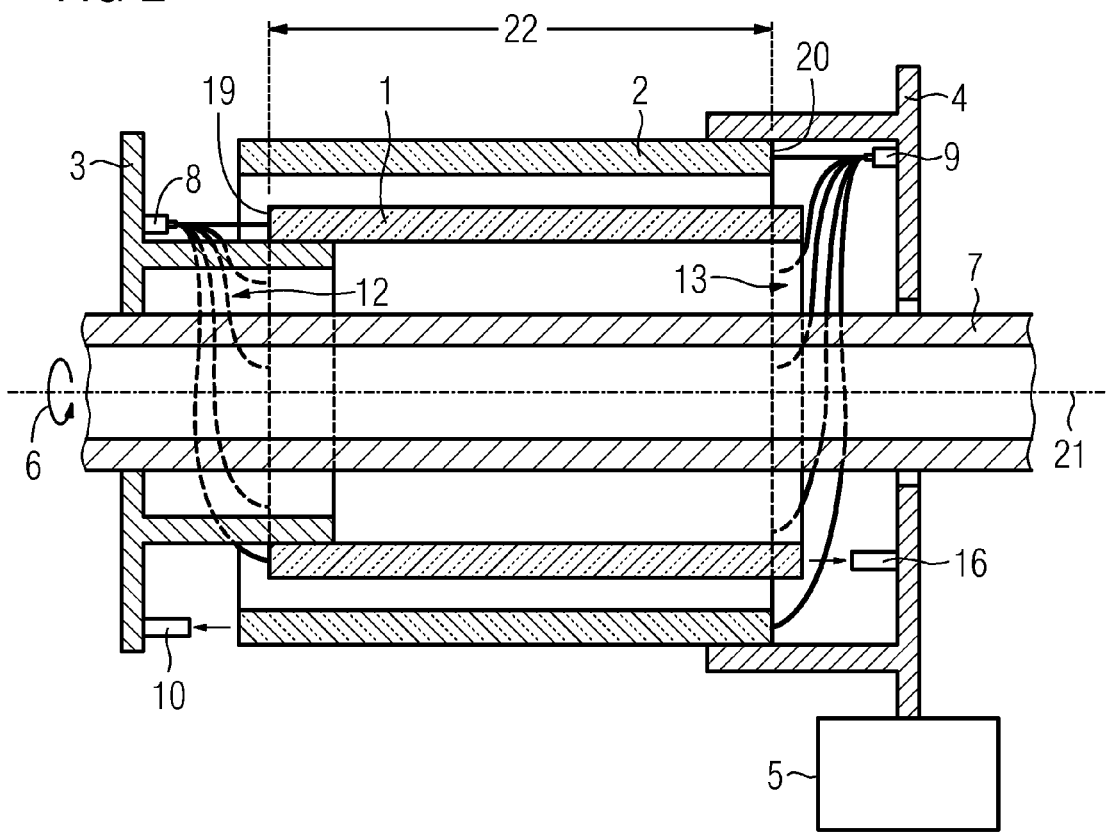
FIG. 2 shows a second inventive embodiment of the rotary joint.

A further embodiment variant of the invention is shown in FIG. 2. The embodiment variant shown in FIG. 2 substantially corresponds in its basic layout to the embodiment variant described in FIG. 1. Identical elements are therefore labeled in FIG. 2 with the same reference signs as in FIG. 1. The essential difference of the embodiment variant according to FIG. 2 compared with the embodiment variant according to FIG. 1 lies in the fact that in the embodiment variant according to FIG. 2 the first and the second hollow body are not arranged axially one behind the other, but instead the first and the second hollow body are arranged axially one inside the other at least in a partial region 22. A transmission of the first light signal from the first transmitter 8 to the first receiver 16 takes place exclusively by way of the first hollow body 1. A transmission of the second light signal from the second transmitter 9 to the second receiver 10 takes place exclusively by way of the second hollow body 2. The light signals emerging from the hollow bodies at the end face side in the direction of the receiver are indicated in FIG. 2 by means of an arrow in each case.

If only a unidirectional data communication is to be implemented, it is sufficient in the case of the embodiment variant according to FIG. 2 for the rotary joint to have only a first hollow body. The second hollow body is then not required and can be omitted.

Figure 3:
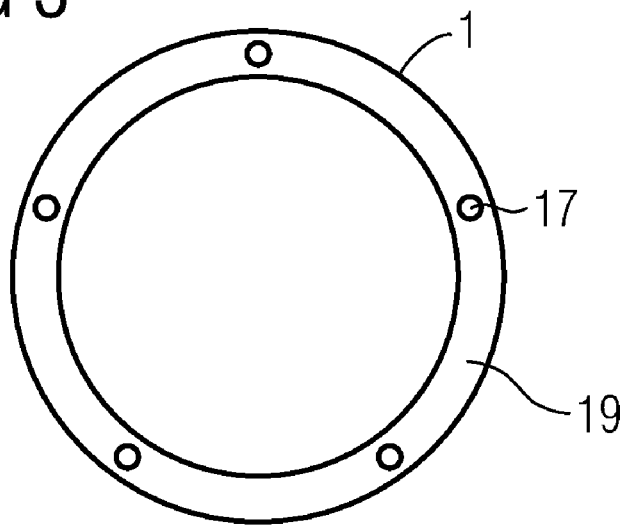
FIG. 3 shows connectors on the end face of the first hollow body.

FIG. 3 shows an end face 19 of the first hollow body 1 having connectors for connecting the optical waveguides 12. For clarity of illustration reasons only one connector 17 is labeled by means of a reference sign in this case.

Figure 4:
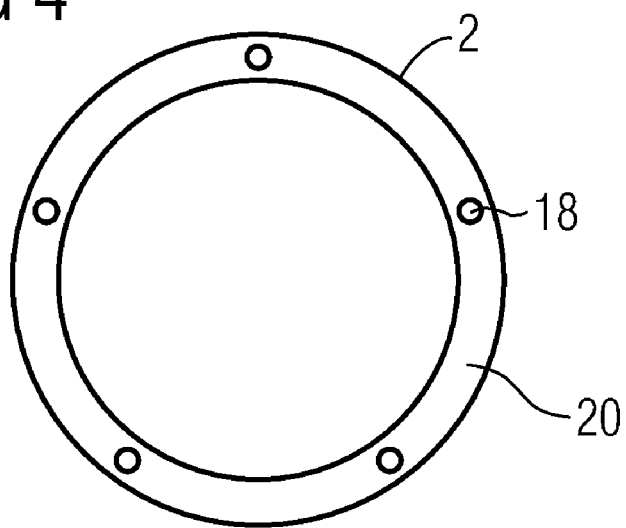
FIG. 4 shows connectors on the end face of the second hollow body.

The end face 20 of the second hollow body 2 having corresponding connectors for connecting the further optical waveguides 13 is shown in FIG. 4. For clarity of illustration reasons only one connector 18 is labeled by means of a reference sign.

Since a spreading of the light beam takes place inside the first and the second hollow body, in each case starting from the respective connection point, a transmission of the light signal from the transmitter to the receiver is possible either over the entire rotation angle range or at least over a relatively wide rotation angle range. If no complete spreading of the light signal over the entire circumference of the receiver-side end face of the hollow body takes place, but a continuous signal transmission is to be implemented nonetheless, it is beneficial, as illustrated in the two exemplary embodiments according to FIG. 1 and FIG. 2, to connect not just a single optical waveguide but the respective transmitter by means of a plurality of optical waveguides 12 and 13 to the respectively associated hollow body. Particularly advantageously, the respective connectors of the optical waveguides should in this case be arranged uniformly over the end face of the respective associated hollow body, as shown in FIGS. 3 and 4, so that a continuous transmission of data between the first hollow body and the second hollow body is possible unidirectionally or bidirectionally at any arbitrary rotation angle of the hollow shaft 7.

The optical waveguides can be present e.g. in the form of glass fibers or in the form of polymer optical fibers (POF).

It should also be noted at this juncture that it is self-evidently also possible to dispose a plurality of transmitters and/or receivers both on the side of the first housing component 3 and on the side of the second housing component 4, instead of a single receiver and/or a single transmitter in each case and in this way to increase the transmission reliability even further.

Owing to the mechanical design of the rotary joint it is furthermore possible to realize a simple electrical layout of the rotary joint and avoid errors such as e.g. possible propagation time differences or crosstalk between signal lines during the signal transmission.

It should furthermore be noted at this juncture that the rotary joint can of course be used not only with hollow shafts, but also enables reliable signal transmission with other types of shafts or rotating parts.

The invention claimed is:

1. A rotary joint, comprising:
   a first hollow body comprising a first light conducting material, the first light conducting material comprising an annular shape that is concentric with an axis of rotation of the rotary joint;
   a first transmitter for generating a first light signal; and
   a first receiver for receiving the first light signal,
   wherein the first light signal is transmitted from the first transmitter to the first receiver through the first light-conducting material.

2. The rotary joint as claimed in claim 1, further comprising:
   a second hollow body comprising a second light conducting material, the second light conducting material comprising an annular shape, wherein the first light-conducting material and the second light-conducting material are disposed coaxially and rotatably relative to each other.

3. The rotary joint as claimed in claim 2, wherein the first and the second light-conducting materials are disposed coaxially and end to end, and wherein the first light signal is transmitted from the first transmitter to the first receiver through the first and the second light-conducting materials.

4. A rotary joint, comprising:
   a first hollow body comprising a first light conducting material,
   a first transmitter for generating a first light signal;
   a first receiver for receiving the first light signal, wherein the first light signal is transmitted from the first transmitter to the first receiver through the first light-conducting material; and
   a second hollow body comprising a second light conducting material, wherein the first hollow body and the second hollow body are disposed coaxially and rotatably relative to each other;
   wherein the first and the second hollow bodies are disposed coaxially one inside the other at least in a partial region.

5. The rotary joint as claimed in claim 2, wherein the first or the second light-conducting material is embodied as a tube.

6. The rotary joint as claimed in claim 2, wherein the first and the second light-conducting materials are embodied as tubes.

7. The rotary joint as claimed in claim 1, further comprising:
   a plurality of optical waveguides, wherein the first transmitter is connected to a first end face of the first light-conducting material by way of the plurality of optical waveguides for transmitting the first light signal.

8. The rotary joint as claimed in claim 7, further comprising:
   connectors, wherein the optical waveguides are directly connected to the first end face of the first light conducting material by the connectors that are uniformly distributed over the first end face.

9. The rotary joint as claimed in claim 2, further comprising:
   a second transmitter for generating a second light signal; and
   a second receiver for receiving the second light signal, wherein
   the first light signal is transmitted from the first transmitter to the first receiver through the first and the second light-conducting materials, and wherein
   the second light signal is transmitted from the second transmitter to the second receiver through the second and the first light-conducting materials.

10. The rotary joint as claimed in claim 3, further comprising:
    a second transmitter for generating a second light signal; and
    a second receiver for receiving the second light signal, wherein
    the second light signal is transmitted from the second transmitter to the second receiver through the second and the first light-conducting materials.

11. A rotary joint, comprising:
    a first hollow body comprising a first light conducting material;
    a first transmitter for generating a first light signal;
    a first receiver for receiving the first light signal, wherein the first light signal is transmitted from the first transmitter to the first receiver through the first light-conducting material;
    a second hollow body comprising a second light conducting material, wherein the first hollow body and the second hollow body are disposed coaxially and rotatably relative to each other;
    a second transmitter for generating a second light signal; and a second receiver for receiving the second light signal, wherein
the first light signal is transmitted from the first transmitter to the first receiver through the first light-conducting hollow body but not through the second light-conducting material, and wherein
the second light signal is transmitted from the second transmitter to the second receiver through the second light-conducting material but not through the first light-conducting material.

12. The rotary joint as claimed in claim 4, further comprising:
a second transmitter for generating a second light signal; and
a second receiver for receiving the second light signal, wherein the first light signal is transmitted from the first transmitter to the first receiver through the first light-conducting material but not through the second light-conducting material, and wherein
the second light signal is transmitted from the second transmitter to the second receiver through the second light-conducting material but not through the first light-conducting material.

13. A rotary joint, comprising:
a first hollow body comprising a first light conducting material;
a first transmitter for generating a first light signal;
a first receiver for receiving the first light signal, wherein the first light signal is transmitted from the first transmitter to the first receiver through the first light-conducting material;
a second hollow body comprising a second light conducting material, wherein the first hollow body and the second hollow body are disposed coaxially and rotatably relative to each other;
a second transmitter for generating a second light signal;
a second receiver for receiving the second light signal, wherein the first light signal is transmitted from the first transmitter to the first receiver through the first and the second light-conducting materials, and wherein the second light signal is transmitted from the second transmitter to the second receiver through the second and the first light-conducting materials; and
optical waveguides, wherein the first transmitter is connected to a first end face of the first hollow body by way of the optical waveguides for transmitting the first light signal, and wherein the second transmitter is connected to a first end face of the second hollow body by way of further optical waveguides for transmitting the second light signal.

14. The rotary joint as claimed in claim 13, further comprising:
connectors, wherein the optical waveguides are connected to the first end face of the first hollow body by the connectors uniformly distributed over the first end face of the first hollow body, and wherein the further optical waveguides are connected to the first end face of the second hollow body by further connectors uniformly distributed over the first end face of the second hollow body.

15. The rotary joint as claimed in claim 11, further comprising:
optical waveguides, wherein the first transmitter is connected to a first end face of the first hollow body by way of the optical waveguides for transmitting the first light signal, and wherein the second transmitter is connected to a first end face of the second hollow body by way of further optical waveguides for transmitting the second light signal.

16. The rotary joint as claimed in claim 1, wherein the first light-conducting material is effective to spread the first light signal as the first light signal passes through the first light-conducting material.

17. The rotary joint as claimed in claim 16, wherein the first light-conducting material is effective to spread the first light signal over an entire rotation angle of a second end face of the first light-conducting material that emits the first light signal.

18. The rotary joint as claimed in claim 3, wherein the first light signal is transmitted from a second end face of the first light-conducting material to a second end face of the second light-conducting material.

19. The rotary joint as claimed in claim 10, wherein the first light signal is transmitted from a second end face of the first light-conducting material to a second end face of the second light-conducting material, and wherein the second light signal is transmitted from the second end face of the second light-conducting material to the second end face of the first light-conducting material.

20. The rotary joint as claimed in claim 1, wherein the first light signal is transmitted from a first end face of the second light-conducting material to the first receiver via an optical waveguide.

* * * * *